United States Patent
Verma et al.

(10) Patent No.: US 11,859,743 B2
(45) Date of Patent: Jan. 2, 2024

(54) SYSTEM FOR SPACING AND FASTENING TUBULAR STRUCTURES

(71) Applicant: General Electric Company, Schenectady, NY (US)

(72) Inventors: Naleen Kumar Verma, Bengaluru (IN); Mario Alberto Bolaños Jimenez, Querétaro (MX); Arun Ramachandra, Bengaluru (IN); Jeffrey P. Darnell, Cincinnati, OH (US); Michael E. Sandy, Liberty Township, OH (US); José Torre, Querétaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/451,056

(22) Filed: Oct. 15, 2021

(65) Prior Publication Data
US 2023/0124484 A1  Apr. 20, 2023

(51) Int. Cl.
  *F16L 3/22*   (2006.01)
  *F16L 3/10*   (2006.01)
  *F16L 3/233*  (2006.01)

(52) U.S. Cl.
  CPC ............ *F16L 3/221* (2013.01); *F16L 3/1058* (2013.01); *F16L 3/2334* (2013.01)

(58) Field of Classification Search
  CPC ......... F16L 3/221; F16L 3/1058; F16L 3/233; F16L 3/2334
  See application file for complete search history.

(56) References Cited

U.S. PATENT DOCUMENTS

| | | | |
|---|---|---|---|
| 4,601,447 A | 7/1986 | McFarland | |
| 4,913,386 A | 4/1990 | Sugiyama | |
| 5,027,478 A * | 7/1991 | Suhr | F16L 3/223 24/339 |
| 5,474,268 A | 12/1995 | Yu | |
| 5,742,982 A * | 4/1998 | Dodd | F16L 3/22 248/74.1 |
| 5,901,756 A | 5/1999 | Goodrich | |
| 6,710,249 B1 * | 3/2004 | Denton | H02G 3/24 174/152 G |
| 8,230,555 B2 | 7/2012 | Browne et al. | |
| 8,240,620 B2 * | 8/2012 | Walter | F16L 3/223 248/68.1 |
| 8,590,847 B2 * | 11/2013 | Guthke | H02G 3/32 248/74.1 |

(Continued)

FOREIGN PATENT DOCUMENTS

| | | | | |
|---|---|---|---|---|
| EP | 2900565 B1 | 2/2017 | | |
| EP | 3284992 A1 * | 2/2018 | ............ | F16L 3/1058 |
| WO | WO-2009117247 A2 * | 9/2009 | ......... | B65D 63/1027 |

*Primary Examiner* — Eret C McNichols
(74) *Attorney, Agent, or Firm* — Venable LLP; Elizabeth C. G. Gitlin; Michele V. Frank (57) ABSTRACT

A system for spacing and fastening tubular structures, and a related method. The system includes a spacer element configured to engage a plurality of tubular structures, to spatially separate the plurality of tubular structures from one another, and to distribute stress in the plurality of tubular structures. The system further includes a fastening element configured to extend around at least a portion of an outer surface of the plurality of tubular structures, and to fasten the plurality of tubular structures to the spacer element in an adaptively spaced configuration.

13 Claims, 8 Drawing Sheets

(56) References Cited

U.S. PATENT DOCUMENTS

| | | | |
|---|---|---|---|
| 8,664,544 B2* | 3/2014 | Even | F03D 80/85 |
| | | | 174/72 A |
| 9,021,681 B2* | 5/2015 | Owen | B65D 63/1027 |
| | | | 24/17 AP |
| 9,212,677 B2 | 12/2015 | Owen | |
| 9,217,519 B2 | 12/2015 | Masters et al. | |
| 9,534,708 B2* | 1/2017 | Cripps, II | F16L 3/221 |
| 9,587,433 B2* | 3/2017 | Sylvester | F16L 3/233 |
| 9,587,448 B2* | 3/2017 | Decker | E21B 19/00 |
| 9,837,802 B1* | 12/2017 | Welch | B65H 57/16 |
| 9,856,998 B2 | 1/2018 | Cripps, II | |
| 10,199,620 B2* | 2/2019 | Romand | H01M 50/262 |
| 10,495,126 B2* | 12/2019 | Bejin | F16L 3/137 |
| 10,850,025 B2* | 12/2020 | Bulloch | A61M 5/1418 |
| 2003/0173470 A1* | 9/2003 | Geiger | F16L 55/035 |
| | | | 248/55 |
| 2009/0272576 A1* | 11/2009 | Medina | B60R 16/0215 |
| | | | 174/72 A |
| 2011/0290951 A1* | 12/2011 | Guthke | H02G 3/32 |
| | | | 248/68.1 |
| 2017/0102099 A1* | 4/2017 | Cripps, II | F16L 3/222 |

\* cited by examiner

202 Providing a spacer element

204 Engaging a plurality of tubular structures to the spacer element

206 Spatially separating the tubular structures from one another

208 Distributing stress in the tubular structures

212 Extending a fastening element around a portion of the outer surface of the tubular structures

214 Fastening the tubular structures to the spacer element in an adaptively spaced configuration

FIG. 7

SYSTEM FOR SPACING AND FASTENING TUBULAR STRUCTURES

TECHNICAL FIELD

The present disclosure relates to spacing and fastening systems for tubular structures deployed in engineering assemblies. In particular, the present disclosure relates to spacer elements for supporting and separating tubular structures deployed in engineering assemblies.

BACKGROUND

Gas turbine engines and other engineering assemblies typically include arrays or banks of tubes or pipes deployed in several locations for transport of liquids and gaseous products. Tubes or pipes are typically bundled using permanently joined spacer elements such as brazed or welded blocks and tabs.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

Reference will now be made in detail to present embodiments of the disclosed subject matter, one or more examples of which are illustrated in the accompanying drawings. The detailed description uses numerical and letter designations to refer to features in the drawings. Like or similar designations in the drawings and description have been used to refer to like or similar parts of the disclosed subject matter. As used herein, the terms "first," "second," "third," "fourth," and "exemplary" may be used interchangeably to distinguish one component from another and are not intended to signify location or importance of the individual components.

Further, to more clearly and concisely describe and point out the subject matter, the following definitions are provided for specific terms, which are used throughout the following description and the appended claims, unless specifically denoted otherwise with respect to a particular embodiment. The term "tube spacing and fastening system" as used in the context refers to a group of interacting or interrelated elements that act according to a set of rules to form a unified whole deployed to spatially separate tubes or its equivalents, such as pipes, rods, bars or any tubular structure and at the same time, to fasten them together. The detailed description uses numerical and letter designations to refer to features of tube spacing and fastening systems in the drawings. Like or similar designations in the drawings and description have been used to refer to like or similar tube spacing and fastening systems. As used herein, the numerals "20," "40," "60," and "80" may be used interchangeably to distinguish one system from another and are not intended to signify location or importance of the individual systems.

The term "spacer element" as used in the context refers to a device or piece used to create or maintain a desired amount of space between two or more objects. The detailed description uses numerical and letter designations to refer to features of spacer elements in the drawings. Like or similar designations in the drawings and description have been used to refer to like or similar spacer elements. As used herein, the numerals "22," "42," "62," and "82" may be used interchangeably to distinguish one spacer element from another and are not intended to signify location or importance of the individual spacer elements.

The term "core part" as used in the context refers to a central and foundational portion of a spacer element, usually distinct from the enveloping portions by a difference in nature or structure or function. The detailed description uses numerical and letter designations to refer to features of core parts in the drawings. Like or similar designations in the drawings and description have been used to refer to like or similar core parts. As used herein, the numerals "29," "45," and "86" may be used interchangeably to distinguish one core part from another and are not intended to signify location or importance of the individual core parts.

The term "fastening element" as used in the context refers to a device or component that structurally joins or affixes two or more objects together. In general, fasteners are used to create non-permanent joints, that is, joints that can be removed or dismantled without damaging the joining components. The detailed description uses numerical and letter designations to refer to features of fastening elements in the drawings. Like or similar designations in the drawings and description have been used to refer to like or similar fastening elements. As used herein, the numerals "23," "46," "72," and "92" may be used interchangeably to distinguish one fastening element from another and are not intended to signify location or importance of the individual fastening elements.

The term "raised slot edge" as used in the context refers to elevated sides of a narrow, elongated depression, groove, slit, notch, slit, or aperture, especially a narrow opening on a spacer element for receiving or admitting something of a planar dimension such as a fastening strap or band. The detailed description uses numerical and letter designations to refer to features of raised slot edges in the drawings. Like or similar designations in the drawings and description have been used to refer to like or similar raised slot edges. As used herein, the numerals "54," and "68" may be used interchangeably to distinguish one raised slot edge from another and are not intended to signify location or importance of the individual raised slot edges.

The term "top end" as used in the context refers to the highest or uppermost point, portion, or surface of a spacer element. The detailed description uses numerical and letter designations to refer to features of top ends in the drawings. Like or similar designations in the drawings and description have been used to refer to like or similar top ends. As used herein, the numerals "37," and "65" may be used interchangeably to distinguish one top end from another and are not intended to signify location or importance of the individual top ends.

Similarly, the term "bottom end" as used in the context refers to the lowest or lowermost point, portion, or surface of a spacer element. The detailed description uses numerical and letter designations to refer to features of bottom ends in the drawings. Like or similar designations in the drawings and description have been used to refer to like or similar bottom ends. As used herein, the numerals "38," and "66" may be used interchangeably to distinguish one bottom end from another and are not intended to signify location or importance of the individual bottom ends.

The term "top tray slot" as used in the context refers to a narrow, elongated depression, groove, notch, slit, or aperture, especially a narrow opening on top of a spacer element for receiving or admitting something of a planar dimension such as a fastening strap or a band. The detailed description uses numerical and letter designations to refer to features of top tray slots in the drawings. Like or similar designations in the drawings and description have been used to refer to like or similar top tray slots. As used herein, the numerals "52," and "67" may be used interchangeably to distinguish one top tray slot from another and are not intended to signify location or importance of the individual top tray slots.

The term "tube outer surface" as used in the context refers to an outermost or uppermost or exterior boundary or layer or area of a tube. The detailed description uses numerical and letter designations to refer to features of tube outer surfaces in the drawings. Like or similar designations in the drawings and description have been used to refer to like or similar tube outer surfaces. As used herein, the numerals "26," "47," "73," and "93" may be used interchangeably to distinguish one tube outer surface from another and are not intended to signify location or importance of the individual tube outer surfaces.

The tube spacing and fastening system of the present disclosure provides for coupling multiple tubular structures together. The tube spacing and fastening system of the present disclosure couples or connects multiple tubular structures together without brazes or welds. In some examples, the tube spacing and fastening system may include a spacer element and a fastening band for coupling the multiple tubular structures. The spacer element functionally addresses an engineering contradiction of holding the tubular structures together and, at the same time, spatially separating them from another. The fastening band extends around the outer surfaces of the tubular structures and fastens them to the spacer element, loosely below a predetermined temperature range and conversely, tightly above the predetermined temperature range.

The spacer element is also configured to distribute stress in each of the plurality of tubular structures in relation to the spacer element. Surface features may be present on the spacer. Further, the tube spacing and fastening system of the present disclosure may allow for coupling of multiple tubular structures in a manner that reduces, prevents, or eliminates high stress concentrations.

Gas turbine engine installations include tubes or conduits carrying fuel, oil, hydraulic fluids ore pressurized air. The tubes or conduits are usually bundled together to carry the fluid within or across several compartments and components (such as fan, compressor, turbine) of the engine under a nacelle or to discharge the fluid overboard. Tube or pipe assemblies deployed in engineering assemblies found in aircraft engines, heat exchangers, and nuclear power structures typically bundle the tubes using spacers. The spacers may be permanently joined to the tube bundle, for example, with brazed or welded blocks and tabs. For example, a typical tube assembly of exemplary tubular structures may include, in a non-limiting manner, tubes, pipes, rods, bars, or combinations thereof. In one instance, an exemplary tube assembly may include a bank of exemplary tubes permanently joined (e.g., brazed or welded) in a clamp forming a clamp-tube assembly. In one instance, an exemplary tube assembly may include a bank of exemplary tubes permanently joined (e.g., brazed or welded) in a spacer forming a permanently joined spacer-tube assembly.

Figure 1A:
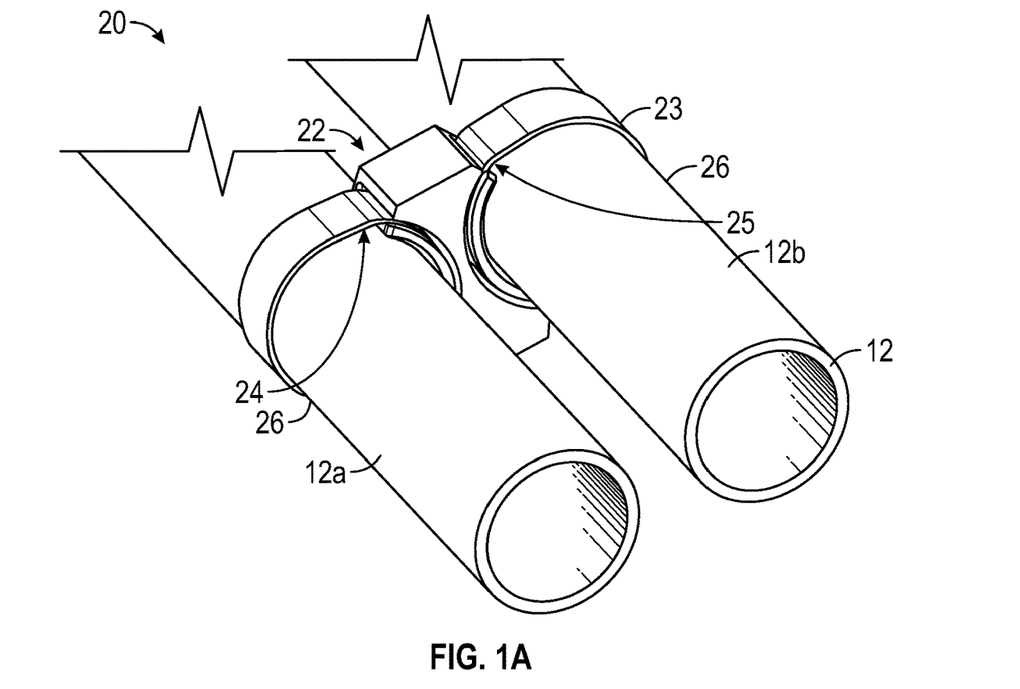
FIG. 1A shows a schematic, perspective view of a tube spacing and fastening system for tubular structures, according to an embodiment of the present disclosure.

FIG. 1A shows a schematic, perspective view of a tube spacing and fastening system for tubular structures, such as tubes, pipes, rods and bars, according to an embodiment of the present disclosure, typically found in engineering assemblies associated with aircraft engines. Referring to FIG. 1A, a bank of exemplary tubes 12 is assembled in a tube spacing and fastening system 20. The tube spacing and fastening system 20 may include a spacer element 22 configured to engage the exemplary tubes 12 and spatially separate one exemplary tube 12a from another exemplary tube 12b. The spacer element 22 may spatially separate the exemplary tubes 12 and distribute stress in the tube spacing and fastening system 20. Further, a fastening element 23 is configured to extend around at least a portion of an outer surface 26 of the exemplary tubes 12 and the fastening element 23 is configured to extend around at least a portion of the outer surface 26 of the exemplary tubular structures 12, and to fasten the exemplary tubes 12 to the spacer element 22 in an adaptively spaced configuration. In one instance, the adaptively spaced configuration may include a first length of the fastening element 23 below a predetermined temperature range and a second length of the fastening element 23 above the predetermined temperature range, such that the first length is different from the second length. Further, in another instance, the adaptively spaced configuration may include a first configuration, wherein the exemplary tubes 12 are movably spaced around the spacer element 22 and a second configuration, wherein the exemplary tubes 12 are immovably spaced around the spacer element 22.

Figure 1B:
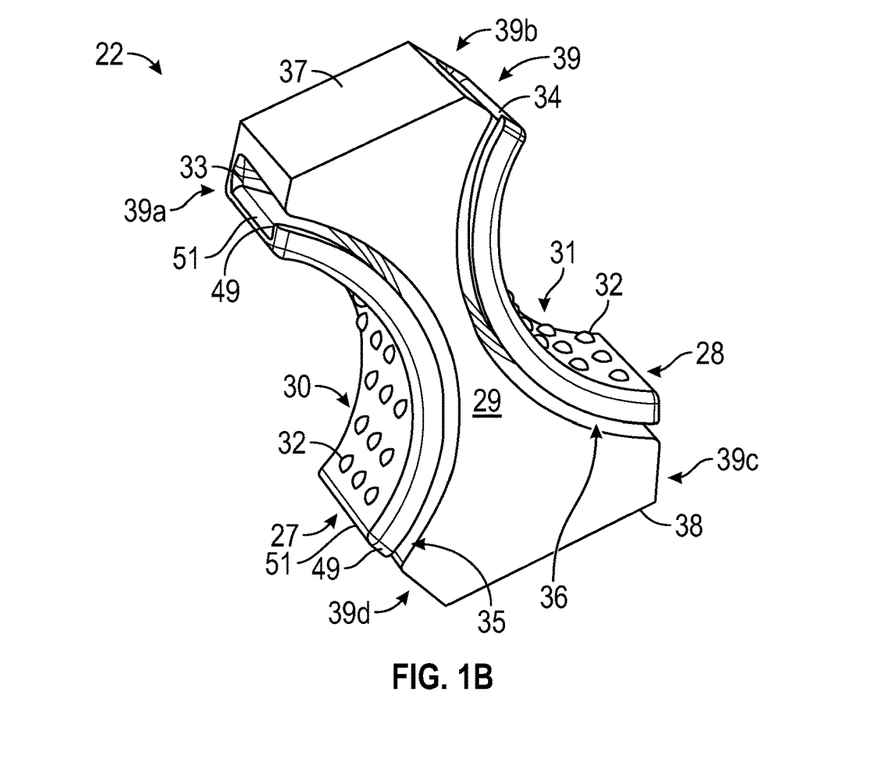
FIG. 1B shows an enlarged schematic, perspective front view of a spacer for the tube spacing and fastening system of FIG. 1A, according to an embodiment of the present disclosure.
Figure 1C:
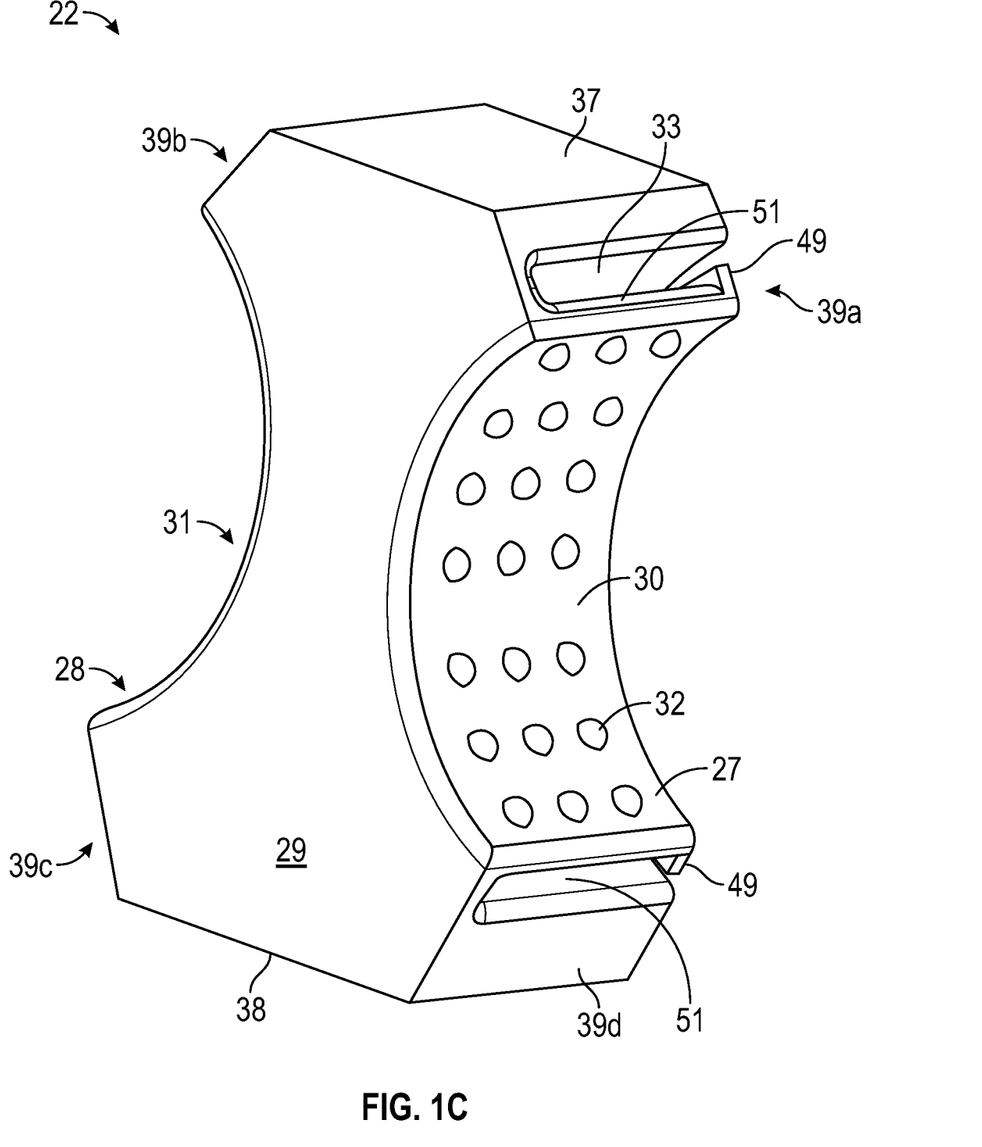
FIG. 1C shows an enlarged schematic, perspective back view of a spacer for the tube spacing and fastening system of FIG. 1A, according to an embodiment of the present disclosure.

FIG. 1B shows an enlarged schematic, perspective front view of the spacer element 22 as in the tube spacing and fastening system 20 for exemplary tubes 12 of FIG. 1A. FIG. 1C shows an enlarged schematic, perspective back view of the spacer element 22 for the tube spacing and fastening system 20 of FIG. 1A. Referring to FIGS. 1B and 1C, the spacer element 22 may include two opposing faces, a first cradle bracket 27 and a second cradle bracket 28, separated by a core part 29 positioned in the center of the spacer element 22 and in between the first cradle bracket 27 and the second cradle bracket 28. The first cradle bracket 27, the second cradle bracket 28, and/or the core part 29 may be concave or may be any shape configured to complement the shape of the exemplary tubes 12. In one instance, the core part 29 may be a double-concave core part. The spacer element 22 may be a spacer block and may be a solid block. The first cradle bracket 27 and the second cradle bracket 28 may be formed in the body of the spacer element 22.

With continued reference to FIGS. 1B and 1C, a first contact surface 30 may engage the corresponding first exemplary tube 12a (FIG. 1A) at the first cradle bracket 27 and a second contact surface 31 may engage the corresponding second exemplary tube 12b (FIG. 1A) at the second cradle bracket 28. The first contact surface 30, the second contact surface 31, or both, may include a number of exemplary surface features 32, such as, for example, but not limited to, indentations or protrusions.

Going into more detail, the spacer element 22 employs the first cradle bracket 27 configured to engage the first exemplary tube 12a (FIG. 1A) and the second cradle bracket 28 configured to engage the second exemplary tube 12b (FIG. 1A). The core part 29 spatially separates the first cradle bracket 27 from the second cradle bracket 28, and, thereby, spatially separates the first exemplary tube 12a engaged in the first cradle bracket 27 and the second exemplary tube 12b engaged in the second cradle bracket 28. The spacer element 22 further includes a first recess 33 on one side, carved between the first cradle bracket 27 and a first corresponding surface 35 of the core part 29. In a similar manner, the spacer element 22 further includes a second recess 34 on the other side, carved between the second cradle bracket 28 and a second corresponding surface 36 of the core part 29.

The first recess 33 is configured to accommodate a first part 24 (FIG. 1A) of the fastening element 23 and the second recess 34 is configured to accommodate a second part 25 (FIG. 1A) of the fastening element 23. Each of the first recess 33 and the second recess 34 includes a projected lip 49 (FIGS. 1B and 1C) and a seat 51 (FIGS. 1B and 1C) that, together, keep the fastening element 23 within the respective recess 33 and 34 and prevent from slipping out of the recess, under stress. Continuing to refer to FIGS. 1B and 1C, the first cradle bracket 27, the second cradle bracket 28, and the core part 29 may join at a top end 37 of the spacer element 22 and at a bottom end 38 of the spacer element 22.

In an embodiment of the current disclosure, the fastening element 23 may be a wrap-around band made of a shape memory alloy (SMA). Without being held to any particular theory, it is currently believed that the scientific effect of exemplary shape-memory alloys is based on the phenomenon of continuous appearance and disappearance of the martensite phase with falling temperatures and rising temperatures. This thermoelastic behavior is the result of the transformation from a parent austenite phase, stable at an elevated temperature, to the martensite phase. Specifically, when a pre-deformed, shape memory alloy specimen is heated to the temperature of the parent austenite phase, a complete recovery of the deformation takes place. Complete recovery in this process is limited by the fact that strain must not exceed a critical value which ranges, for example, from 3% to 4% for copper shape-memory effect alloys to 6% to 8% for nickel-titanium shape-memory alloys.

The shape-memory effect, as embodied by the fastening element 23 as an SMA band, is a spontaneous, reproducible, and reversible shape change associated with heating and cooling throughout an overall transformation temperature range. Further, it is possible to condition or 'train' a shape-memory alloy to have a shape-memory effect by repeating the cooling and heating process a number of times. The reversible shape change could be, for example, lengthening and shortening as the trained shape-memory alloy sample is cycled between two transitional temperatures.

Referring to FIG. 1A, when the fastening element 23 is a shape memory alloy band, the fastening element 23 of the current disclosure may have an overall transition temperature range above atmospheric temperature and below a temperature such that the shape memory alloy band may assume a first configuration (length) for tightly supporting the exemplary tubes 12 at a temperature above the overall transition temperature and may assume a second configuration (length) for loosely engaging the exemplary tubes 12 below the overall transition temperature. Thus, for the exemplary tubes 12 to engage with the spacer element 22, the shape memory alloy band may generate high radial compressive force that swages the underlying exemplary tubes 12.

In operation, when the fastening element 23 is a shape memory alloy (SMA) band, the band is configured to be oversized in a cooled, martensitic state and, then, during operation, the band is warmed up to a smaller, contracted size to generate an elastic radial compressive force and thereby engage the exemplary tubes 12 with the spacer element 22. Further, referring to FIG. 1A, the shape memory alloy (SMA) band, in one embodiment of the current disclosure, generates high radial compressive force and swages (compresses or shrinks) underlying tube surfaces to locally yield at the static metal-to-metal joints by swaging a number of surface features (protrusions or indentations or teeth or dimples or ridges) configured on the contact surfaces and, at the same time, remain in continued contact with the spacer element 22.

Any shape-memory alloy may be used in the present disclosure as long as it demonstrates an adequate shape-memory effect. In one embodiment of the current disclosure, the shape-memory alloys include nickel-titanium alloys, in weight ratios selected to deform at a temperature above a desired transition temperature. Further, the chemical composition and transition temperature for the shape memory mental (SMA) are further selected to be appropriate for the desired tube spacing and fastening system operating temperature between ambient and about 1000° F.

Thus, exemplary shape memory alloy (SMA) bands for the fastening element 23 of FIG. 1A utilize their shape-memory characteristic and corresponding configured and memorized length to provide a temperature-sensitive length change and, thereby, a significant degree of adaptive spacing of the exemplary tubes 12 during operation. Specifically, when the exemplary tubes 12 tubes are at their operating temperature above the transition temperature of the shape memory alloy (SMA) bands, typical shape memory alloy (SMA) bands transform to their memorized shorter length, providing a tight and reduced spacing and lateral loading on the exemplary tubes 12. Referring to FIGS. 1A, 1B, and 1C, the shape memory alloy (SMA) band for the fastening element 23 of the current disclosure may engage the first cradle bracket 27 and the second cradle bracket 28 and the outer surfaces 26 of the exemplary tubes 12 upon heating above the parent austenite transition temperature range to a high temperature, tight configuration of the shape-memory alloy.

Conversely, once cooled below the martensite transition temperature range, typical shape memory alloy (SMA) bands convert to their low temperature configuration and is in an expanded length or stretched length or oversized length corresponding to the lower temperatures. Typically, such high temperature configurations are associated with operational conditions when the exemplary tubes 12 need to be in compact, tight and immovable contact. Further low temperature configurations are associated with maintenance or shutdown of the engineering spacing and fastening system and the shape memory alloy (SMA) band enable assume a loose configuration enabling a slidable or movable disengagement of the exemplary tubes 12 from their respective cradle brackets and the spacer element 22. The shape memory alloy (SMA) bands and their shape-memory effect thus inherently provide adaptive spacing for the exemplary tubes 12, in relation to each other and to the spacer element 22 to which they are fastened.

The stress distribution effect of the shape memory alloy (SMA) bands may be further enhanced by adopting a stress-adaptive configuration of the spacer element 22 and related parts and components. For example, contact surfaces where two or more parts engage and/or interact with each other (e.g., the first contact surface 30 and/or the second contact surface 31) may include a stress-adaptive configuration (e.g., surface features configured to reduce contact stress between parts). In another embodiment of the disclosure, one, or more, or all, of the joints 39 in spacer element 22 are filleted for optimal stress distribution at the corners where the fastening element 23 engages with the spacer element 22. In other words, a first exemplary joint 39a between the first cradle bracket 27 and the top end 37, a second exemplary joint 39b between the second cradle bracket 28 and the top end 37, a third exemplary joint 39c between the first cradle bracket 27 and the bottom end 38, and a fourth exemplary joint 39d between the second cradle bracket 28 and the bottom end 38 are all filleted joints.

Referring to FIGS. 1A, 1B, and 1C, the exemplary tubes 12 have diameter in the range of 0.75 to 1.0 inches and wall thickness in the range of 0.020 to 0.035 inches. The width of the spacer element 22 is of the order of 0.5 inches and the thickness of the shape memory alloy (SMA) band is in the range of 0.020 to 0.063 inches.

Continuing to refer to FIGS. 1B and 1C, additional stress distribution configurations may include specially contouring the first contact surface 30 and the second contact surface 31 between the exemplary tubes 12 and the first cradle bracket 27 and the second cradle bracket 28. Accordingly, instead of full surface contact between a stiffer block (e.g., spacer element 22) and a thin-walled tube (e.g., exemplary tubes 12), which generates higher edge contact stress, the spacer element 22 may include exemplary surface features 32. The exemplary surface features 32 may be protrusions (also known as 'beads') in one instance and may be indentations (also known as 'dimples') in another instance. In yet another instance, the surface features 32 may be any combination of protrusions and indentations. The exemplary surface features 32 can be of different shapes with varying cross sections such as spherical-circular (as shown in FIGS. 1B and 1C), or elliptical, or square, or trapezoidal, or triangular, or any combination of these. Thus, the exemplary surface features 32 may create a low stress field at discrete points of contact on the exemplary tubes 12. Specifically, the first exemplary tube 12a joins the first cradle bracket 27 at the first contact surface 30 and the second exemplary tube 12b joins the second cradle bracket 28 at the second contact surface 31, and either the first contact surface 30, or the second contact surface 31, or both include the exemplary surface features 32 that may include protrusions and/or indentations, which may provide effective stress optimization configuration. Thus, referring to FIGS. 1A, 1B, and 1C, the metal-to-metal contacts at the 'thick-walled' first cradle bracket 27 and the 'thick-walled' second cradle bracket 28 may result in high stresses, so the exemplary surface features 32 (protrusions/indentations) may be included in a non-limiting manner. In other words, the exemplary surface features 32 (protrusions/indentations) may be omitted in another instance, if desired.

Figure 2A:
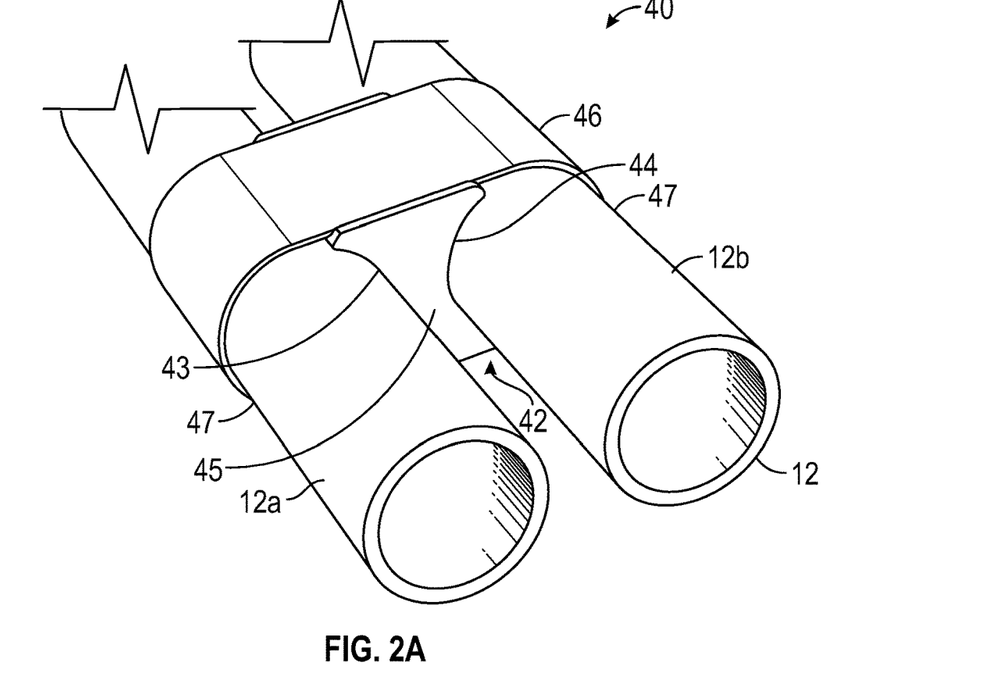
FIG. 2A shows a schematic, perspective view of a tube spacing and fastening system for tubular structures, according to an embodiment of the present disclosure.

FIG. 2A shows a schematic, perspective view of a tube spacing and fastening system 40 for the exemplary tubes 12, according to an embodiment of the present disclosure. Referring to FIG. 2A, the tube spacing and fastening system 40 includes a spacer element 42 with two opposing faces shaped as a first cradle bracket 43 and a second cradle bracket 44 separated by a core part 45. In an embodiment of the current disclosure, outer surfaces of the first cradle bracket 43 and the second cradle bracket 44 may be marked with exemplary surface features including protrusions/indentations (not visible, such as described with respect to FIGS. 1B and 1C). Continuing to refer to FIG. 2A, a fastening element 46 is extended around at least part of an outer surface 47 of each of the exemplary tubes 12 in the tube spacing and fastening system 40 to fasten the exemplary tubes 12 to the spacer element 42. In one instance, the fastening element 46 may be a shape memory alloy (SMA) band.

Figure 2B:
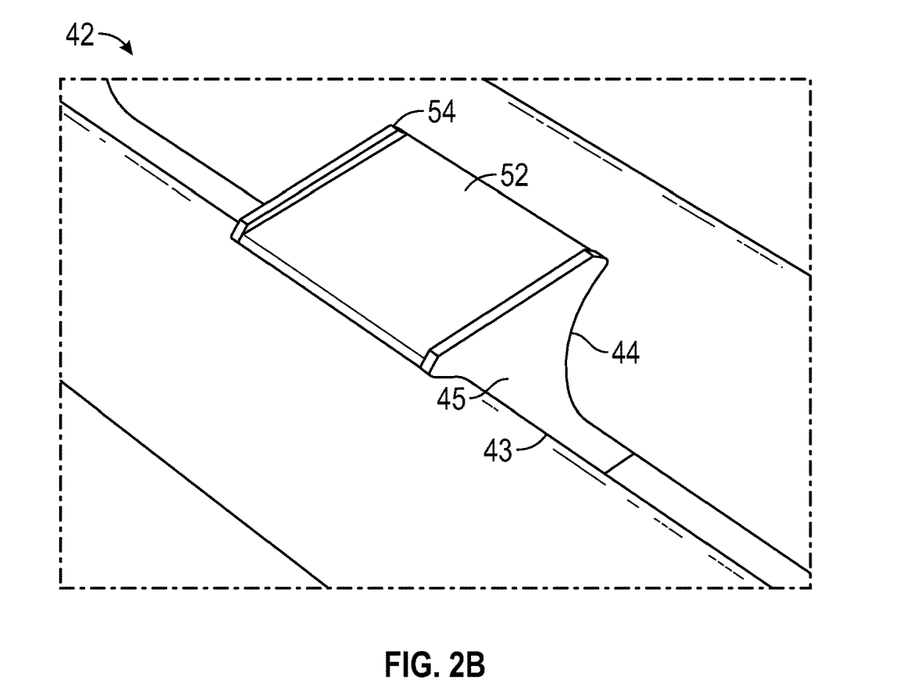
FIG. 2B shows a schematic, perspective view of a spacer for the tube spacing and fastening system of FIG. 2A, according to an embodiment of the present disclosure.

FIG. 2B shows an enlarged schematic, perspective view of the spacer element 42 as in the tube spacing and fastening system 40 for the exemplary tubes 12 of FIG. 2A, according to an embodiment of the present disclosure. Continuing to refer to FIG. 2B, the spacer element 42 is configured as a solid block that includes a seating slot or groove 52 to accommodate the fastening element 46, embodied as a shape memory alloy (SMA) band. The fastening element 46, embodied as a shape memory alloy (SMA) band, typically extends around the spacer element 42 and the exemplary tubes 12. Further, the seating slot or groove 52 may include raised edges 54 on the spacer element 42 to provide a secure or snug seating arrangement for the fastening element 46, embodied as a shape memory alloy (SMA) band within the seating slot or groove 52.

Continuing to refer to FIG. 2B, additional stress distribution configurations may include specially contouring the contact surfaces between the exemplary tubes 12 and the first cradle bracket 43 and the second cradle bracket 44.

Accordingly, instead of full surface contact between a stiffer block (e.g., the spacer element 42) and a thin-walled tube (e.g., the exemplary tubes 12), which generate higher edge contact stress, the spacer element 42 may include exemplary surface features (not shown). The exemplary surface features may be protrusions (also known as 'beads') in one instance and may be indentations (also known as 'dimples') in another instance. In yet another instance the surface features may be any combination of protrusions and indentations. Thus, the exemplary surface features may create a low stress field at discrete points of contact on the exemplary tubes 12. Specifically, the first exemplary tube 12a joins the first cradle bracket 43 at a corresponding first contact surface (not shown) and the second exemplary tube 12b joins the second cradle bracket 44 at a corresponding second contact surface (not shown), and either the first contact surface or the second contact surface or both include exemplary surface features that may include protrusions and/or indentations, which may provide effective stress distribution configuration. Thus, referring to FIGS. 2A and 2B, the metal-to-metal contacts at the 'thick-walled' first cradle bracket 43 and the 'thick-walled' second cradle bracket 44 may result in high stresses, so exemplary surface features (protrusions/indentations) may be included, in a non-limiting manner. In other words, the exemplary surface features (protrusions/indentations) may be omitted in another instance, as desired.

Figure 3A:
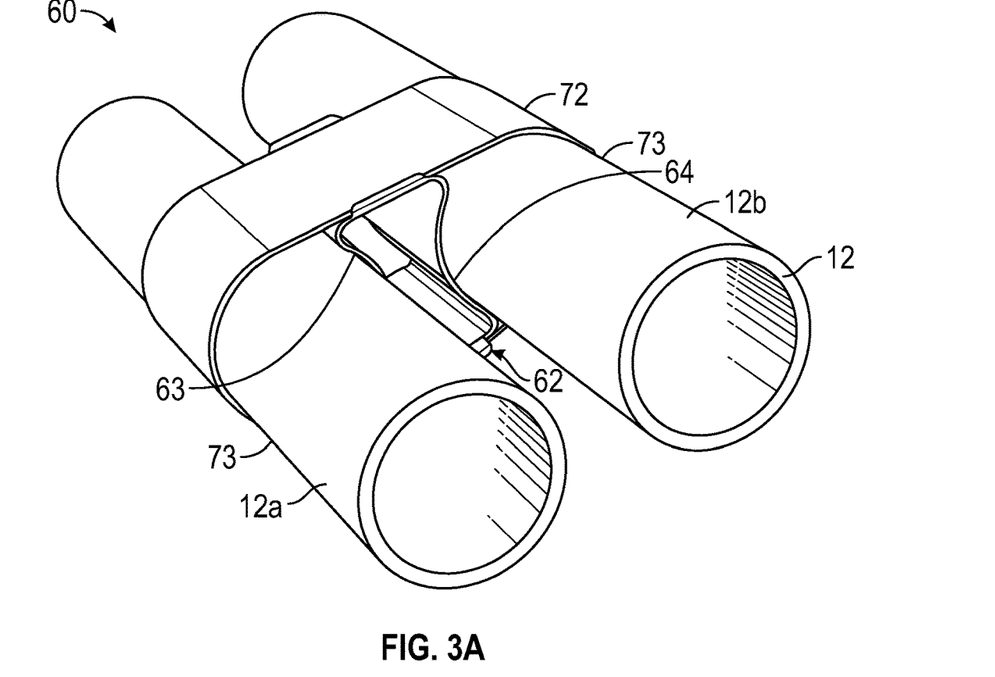
FIG. 3A shows a schematic, perspective view of a tube spacing and fastening system for tubular structures, according to an embodiment of the present disclosure.

FIG. 3A shows a schematic, perspective view of a tube spacing and fastening system 60 for the exemplary tubes 12, according to an embodiment of the present disclosure. Referring to FIG. 3A, the bank of exemplary tubes 12 are assembled in a tube spacing and fastening system 60. Tube spacing and fastening system 60 includes a spacer element 62 with two opposing faces shaped as a first thin-walled bracket 63 and a second thin-walled bracket 64. In one embodiment of the disclosure, outer surfaces of the first thin-walled bracket 63 and second thin-walled bracket 64 are marked with protrusions and/or indentations (not shown), such as described with respect to FIGS. 1B and 1C. The thin-walled bracket 64 and the thin-walled bracket 63 may function as cradles, such as described with respect to FIGS. 1A to 2B, such that the tube spacing and fastening system 60 of FIGS. 3A and 3B includes a plurality of cradles (e.g., thin-walled bracket 64 and thin-walled bracket 63).

Figure 3B:
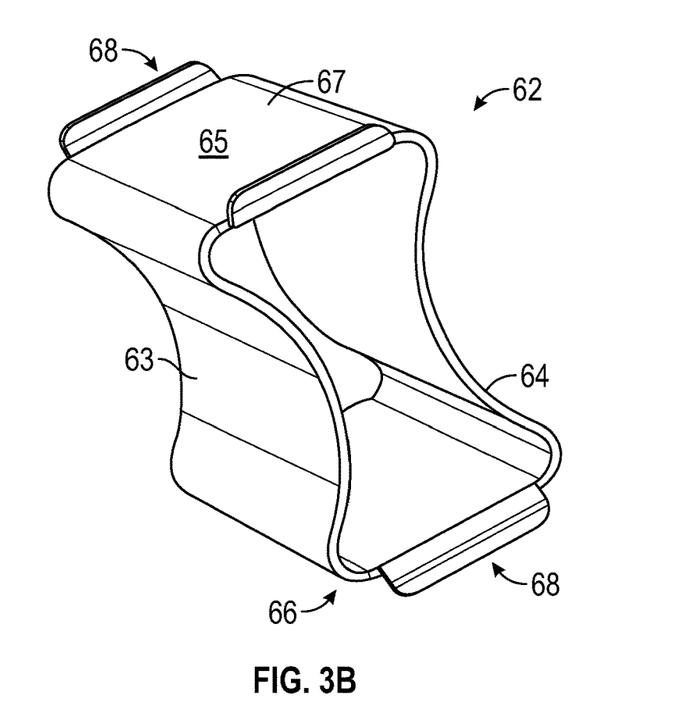
FIG. 3B shows an enlarged schematic, perspective view of a spacer for the tube spacing and fastening system of FIG. 3A, according to an embodiment of the present disclosure.

FIG. 3B shows an enlarged schematic, perspective view of the spacer element 62 as part of the tube spacing and fastening system 60 for the exemplary tubes 12 of FIG. 3A, according to an embodiment of the present disclosure. Continuing to refer to FIG. 3B, the spacer element 62 has a top end 65, a bottom end 66, and a top tray slot 67 with a raised slot edges 68. Further, referring to FIG. 3A and FIG. 3B, a fastening element 72, embodied as a shape memory alloy (SMA) band, is extended around outer surfaces 73 of the exemplary tubes 12 in the tube spacing and fastening system 60 to fasten them to the spacer element 62.

The tube spacing and fastening system 60 may include the spacer element 62 with two opposing faces shaped as the first thin-walled bracket 63 and the second thin-walled bracket 64. In another embodiment of the disclosure, the first thin-walled bracket 63 is configured to engage the first exemplary tube 12a and the second thin-walled bracket 64 is configured to engage the second exemplary tube 12b. The first thin-walled bracket 63 and the second thin-walled bracket 64 join each other at the top end 65 on top of the spacer element 62 and further at the bottom end 66 of the spacer element 62. Further, the first thin-walled bracket 63 and the second thin-walled bracket 64 are spatially separated by a hollow space in between the first thin-walled bracket 63 and the second thin-walled bracket 64.

Continuing to refer to FIGS. 3A and 3B, additional stress distribution configurations may include specially contouring the contact surfaces between the exemplary tubes 12 and the first thin-walled bracket 63 and the second thin-walled bracket 64. Accordingly, instead of full surface contact between a stiffer block (e.g., the spacer element 62) and a thin-walled tube (e.g., the exemplary tubes 12), which generate higher edge contact stress, the spacer element 62 may include exemplary surface features (not shown). The exemplary surface features may be protrusions (also known as 'beads') in one instance and may be indentations (also known as 'dimples') in another instance. In yet another instance, the surface features may be any combination of protrusions and indentations. Thus, the exemplary surface features may create a low stress field at discrete points of contact on the exemplary tubes 12. Specifically, the first exemplary tube 12a joins the first thin-walled bracket 63 at a corresponding first contact surface (not shown) and the second exemplary tube 12b joins the second thin-walled bracket 64 at a corresponding second contact surface (not shown), and either the first contact surface, or the second contact surface, or both, include exemplary surface features that may include protrusions and/or indentations, which may provide effective stress distribution configuration. Thus, referring to FIGS. 3A and 3B, the metal-to-metal contacts at the first thin-walled bracket 63 and the second thin-walled bracket 64 may not result in high stresses, so the exemplary surface features 32 may not be included in a non-limiting manner. In another instance, however, the exemplary surface features 32 may be included and formed as protrusions/indentations, as desired, in order to reduce existing stress.

Figure 4:
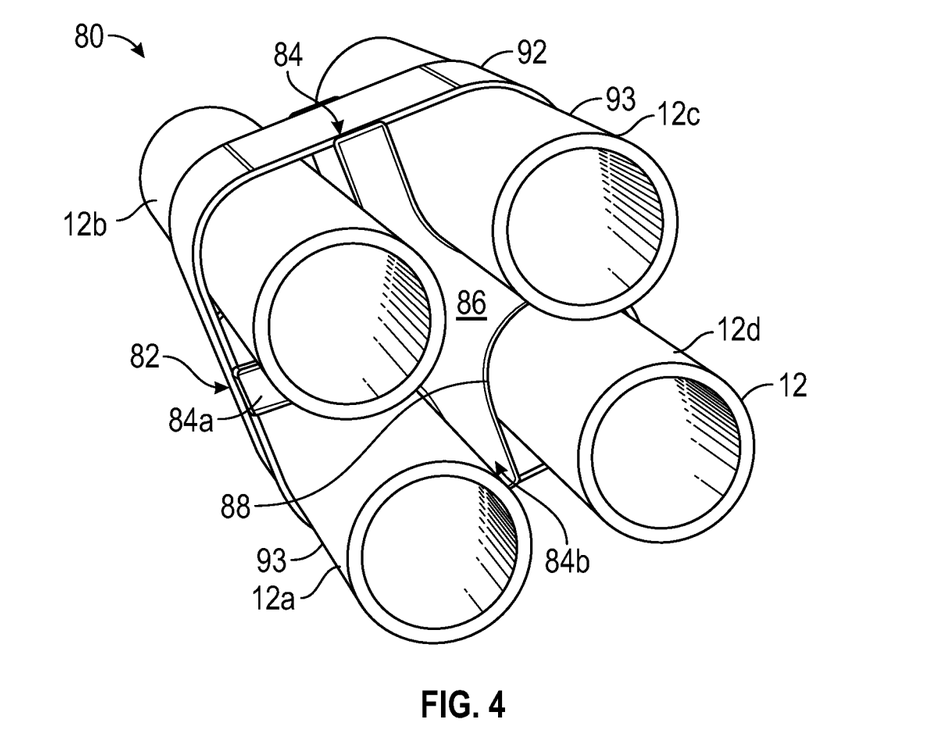
FIG. 4 shows a schematic, perspective view of a tube spacing and fastening system for tubular structures, according to an embodiment of the present disclosure.
Figure 5:
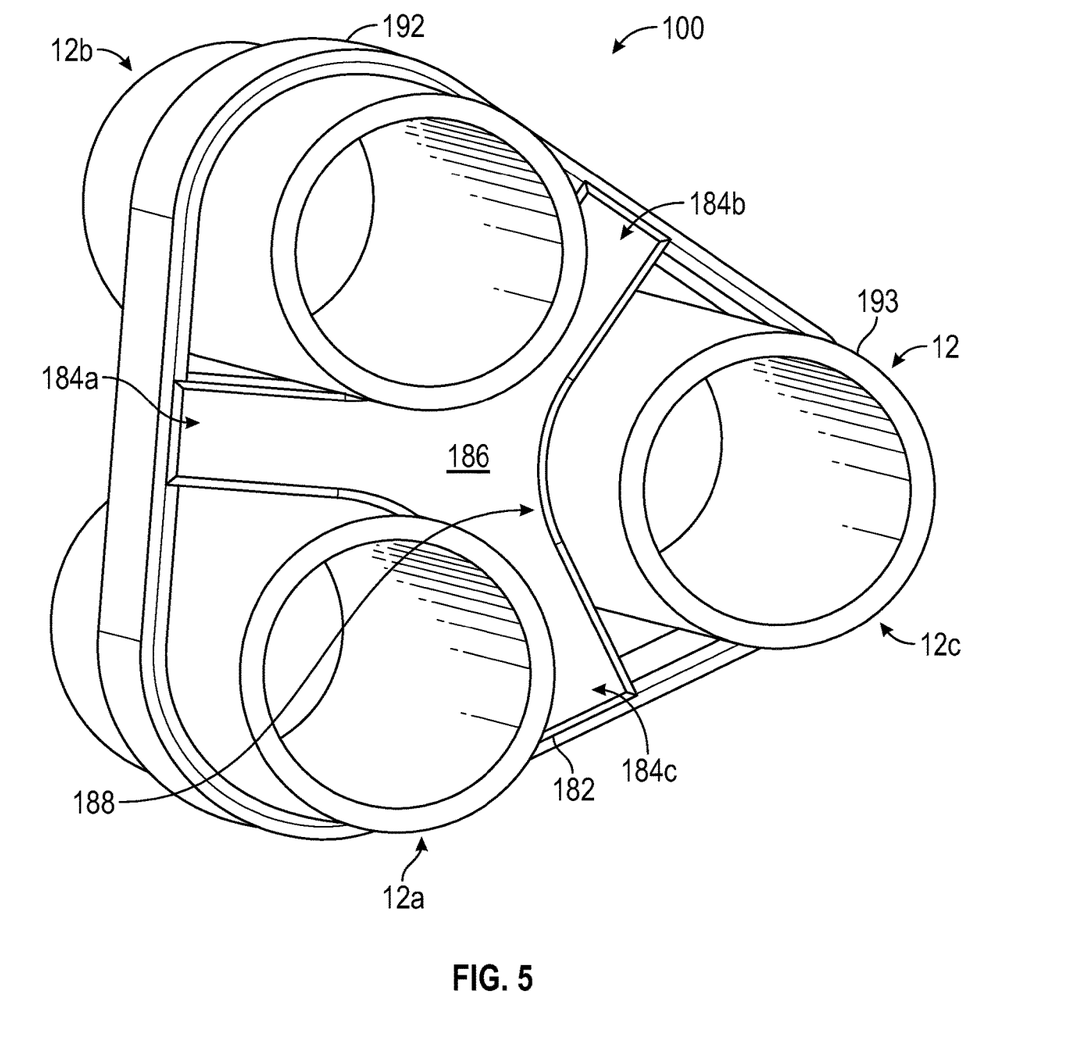
FIG. 5 shows a schematic, perspective view of a tube spacing and fastening system for tubular structures, according to an embodiment of the present disclosure.

FIG. 4 is a schematic, perspective view of a tube spacing and fastening system 80 for the exemplary tubes 12 in accordance with an embodiment of the current disclosure. Referring to FIG. 5, the tube spacing and fastening system 80 includes a spacer element 82. The spacer element 82 may be any predetermined formation, such as a star formation, or cross formation, or any combination thereof. The spacer element 82 may include one or more radial arms 84 arranged in a star formation. Further, each of the radial arms 84 joins at its respective base with a core part 86. The radial arms 84 and the core part 86 may be integral and unitary or may be separate parts coupled or connected together. In the non-limiting example of FIG. 4, there are four exemplary radial arms 84 extending from the core part 86, but, in other embodiments, there may be fewer or more than four radial arms 84. The number of radial arms 84 may be selected based on the number of the exemplary tubes 12 desired to be coupled together.

With continued reference to FIG. 4, an exemplary pair of adjacent radial arms 84a and 84b (two adjacent radial arms) and the core part 86 joining at their respective base, may form an exemplary cradle bracket 88, to engage a corresponding tubular structure, embodied as an outer surface 93 of the exemplary tubes 12. Accordingly, in the example of FIG. 5, four cradle brackets 88 may be formed to accommodate four exemplary tubes—a first exemplary tube 12a, a second exemplary tube 12b, a third exemplary tube 12c and a fourth exemplary tube 12d. The tube spacing and fastening system 80 may include the spacer element 82 constructed in a star formation, or a cross formation, or any combination thereof, with the exemplary radial arms 84 extending outward from the core part 86. In an embodiment, outer surfaces of the radial arms 84 (e.g., the surfaces forming the cradle bracket 88) may be marked with surface features including protrusions/indentations (not shown), such as described with respect to FIGS. 1B, 1C, 2B, 3B, and 6A to 6C. Continuing to refer to FIG. 4, a fastening element 92, embodied as a shape memory alloy (SMA) band may be extended around the outer surfaces 93 of each of the exemplary tubes 12 in the tube spacing and fastening system 80 to fasten them to an exemplary star formation, or a cross formation, or any combination thereof, of the spacer element 82.

Figure 6A:
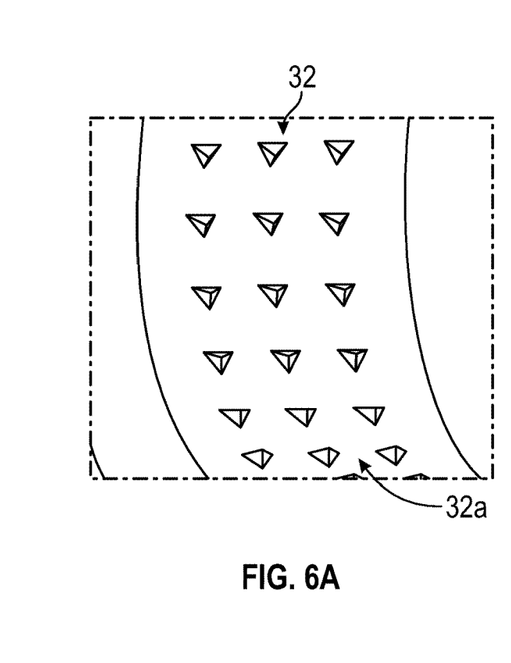
FIG. 6A shows a partial perspective view of a spacer for a tube spacing and fastening system, according to an embodiment of the present disclosure.

FIG. 5 is a schematic, perspective view of a tube spacing and fastening system 100 for the exemplary tubes 12 in accordance with an embodiment of the current disclosure. Referring to FIG. 6, the tube spacing and fastening system 100 includes a spacer element 182. The spacer element 182 includes three exemplary radial arms 184a, 184b, and 184c arranged in a star formation. Each of the radial arms 184a, 184b, and 184c joins at its respective base with a core part 186. The radial arms 184a, 184b, and 184c and the core part 186 can be integral and unitary or can be separate parts coupled or connected together.

With continued reference to FIG. 5, an exemplary pair of adjacent radial arms 184b and 184c (two adjacent radial arms) and the core part 186 joining at their respective base, form an exemplary cradle bracket 188, to engage a corresponding tubular structure, embodied as an outer surface 193 of the exemplary tubes 12. Accordingly, in the example of FIG. 5, three cradle brackets 188 are formed to accommodate three exemplary tubes—the first exemplary tube 12a, the second exemplary tube 12b, and the third exemplary tube 12c. The outer surfaces of the radial arms 184a, 184b, and 184c (e.g., the surfaces forming the cradle bracket 188) are marked with surface features including protrusions/indentations (not shown), such as described with respect to FIGS. 1B, 1C, 2B, 3B, and 6A to 6C. Continuing to refer to FIG. 5, a fastening element 192, embodied as a shape memory alloy (SMA) band is extended around the outer surfaces 193 of each of the exemplary tubes 12a, 12b and 12c to fasten them to the spacer element 182.

Figure 6B:
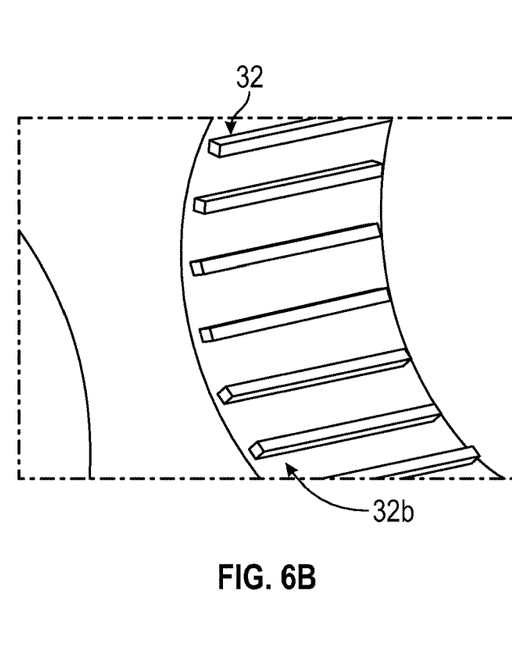
FIG. 6B shows a partial perspective view of a spacer for a tube spacing and fastening system, according to an embodiment of the present disclosure.
Figure 6C:
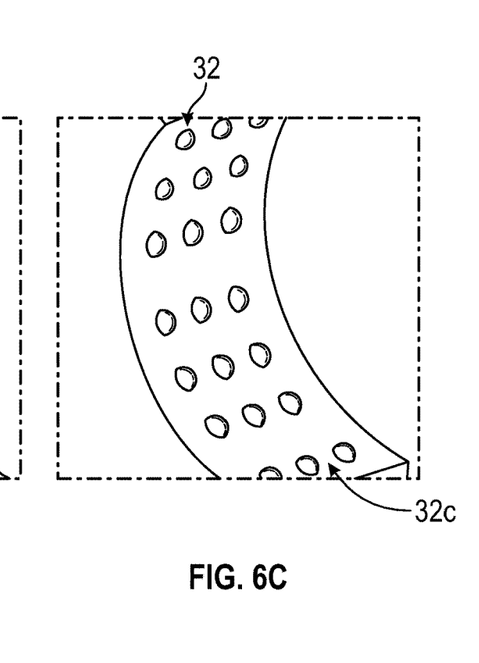
FIG. 6C shows a partial perspective view of a spacer for a tube spacing and fastening system, according to an embodiment of the present disclosure.

FIGS. 6A to 6C show exemplary surface features 32, which may be provided in any or all of the spacer elements described herein, such as, for example, the spacer element 22 (FIG. 1C), the spacer element 42 (FIG. 2A), the spacer element 62 (FIG. 3A), the spacer element 82 (FIG. 4), and the spacer element 182 (FIG. 5). The exemplary surface features 32 may be prismatic surface features 32a (FIG. 6A), elongated rectangular surface features 32b (FIG. 6B), or rounded, semi-spherical surface features 32c (FIG. 6C). Other shapes are also contemplated, such as, for example, cubes or other polygonal shapes, elliptical, square, trapezoidal, triangular, elongated curved shapes, continuous shapes, discrete shapes, etc. Any combination of the surface features shown and/or the surface features described may be provided on the spacer elements of the present disclosure. The surface features 32 may be protrusions, indentations, or combinations thereof. More than one shape of surface features 32 may be provided on a single bracket surface of a spacer element. More thane one shape of surface features 32 may be provided on different bracket surfaces of a single spacer element. The surface features 32 described herein may be formed with additive manufacturing, electrical discharge texturing, or electroforming.

Referring to FIG. 1A to FIG. 6C, the spacer element 22, the spacer element 42, the spacer element 62, the spacer element 82, and the spacer element 182 may be additively manufactured. Further, specifically, the spacer element 22, the spacer element 42, the spacer element 62, the spacer element 82, and the spacer element 182 may be optionally contoured with dimples/ridges/beads through additive manufacturing economically. In other embodiments of the disclosure, other manufacturing methods, such as traditional subtractive manufacturing may be employed to produce the parts from typical machined blocks. As for spacing and fastening system material, the spacer elements 22, 42, 62, and 82 are made of steel, Inconel®, or other suitable metals, such as nitinol (Ni—Ti) that meet high temperature applications as well as provide inherent elasticity to retain extending strength needed for braze-free and weld-free joints.

Any of the spacer blocks, fastening elements, and spacing and fastening systems described herein may be combined with all or portions of the other spacer blocks, fastening elements, and spacing and fastening systems described herein. Although a single spacing and fastening system is shown for the exemplary tubes 12, more may be provided along the length of the exemplary tubes 12. In such a manner, the tube spacing and fastening systems of the present disclosure may include a plurality of spacer blocks and fastening elements. The number may be selected based on the desired coupling and securement of the exemplary tubes 12.

Figure 7:
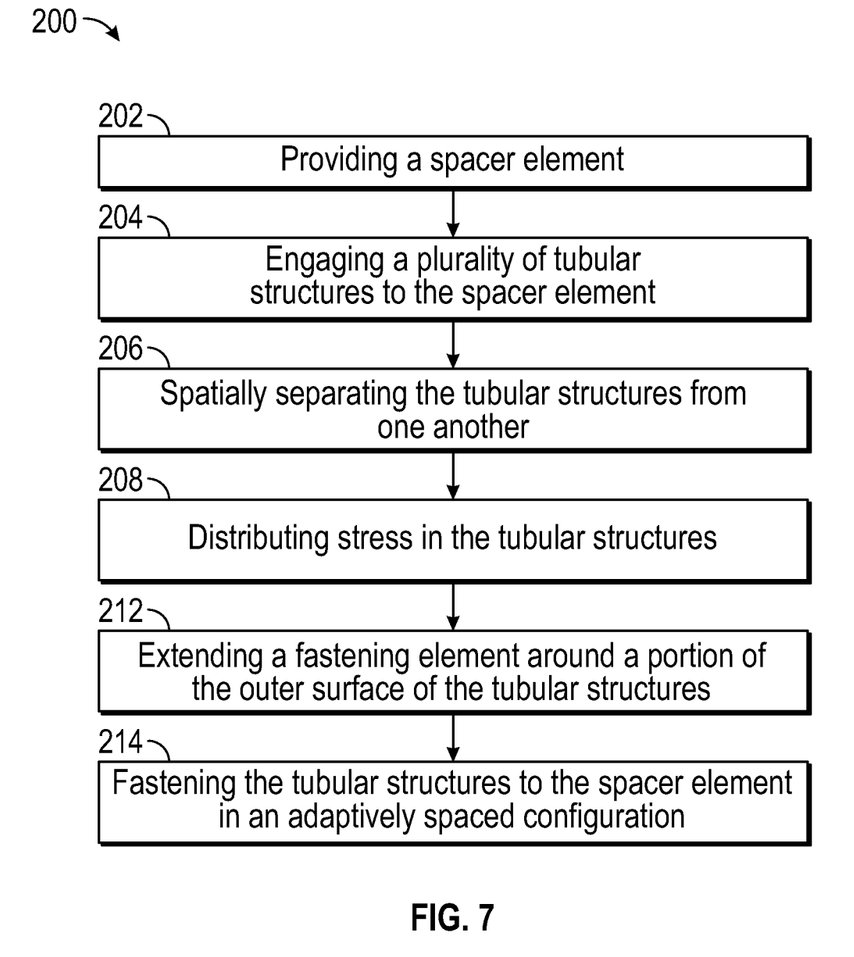
FIG. 7 shows a schematic flow diagram of a method of spacing and fastening a number of tubular structures, according to an embodiment of the present disclosure.

FIG. 7 is a block diagram of a method 200 of spacing and fastening tubular structures in accordance with one embodiment of the current disclosure. Referring to FIG. 7, the method 200 of spacing and fastening tubular structures, such as the exemplary tubes 12, includes in step 202, providing a spacer element, in step 204, engaging a plurality of tubular structures to the spacer element, in step 206, spatially separating the plurality of tubular structures from one another, and in step 208, distributing stress in the plurality of tubular structures. The method 200 further includes, in step 212, extending a fastening element around at least a portion of an outer surface of the plurality of tubular structures and in step 214, fastening the plurality of tubular structures to the spacer element in an adaptively spaced configuration.

In another embodiment of the current disclosure, the method 200 of spacing and fastening tubes further includes non-permanently engaging a first exemplary tube 12a to a first cradle bracket (FIGS. 1B and 1C, 27; FIG. 2A, 43; FIG. 3A, 63; FIG. 4, 88; FIG. 5, 188), engaging a second exemplary tube 12b to a second cradle bracket (FIGS. 1B and 1C, 28; FIG. 2A, 44; FIG. 3A, 64; FIG. 4, 88; FIG. 5, 188) such that the first exemplary tube 12a and the second exemplary tube 12b are spatially separated.

In one aspect of the disclosure, the tube spacing and fastening systems of the present disclosure use appropriate fastening elements to space and fasten the tubes and/or pipes with their structural integrity intact and without any cutting or shearing of the tubes and/or pipes. The spacing and fastening elements, as described in the embodiments of the current disclosure, thereby, improve on several critical operational performance factors including high stress concentration (Kt) at tube joints, difficulty in controlling uniformness of quality (owing to voids, limited braze/weld witness feature, and lack of coverage), low high-cycle fatigue (HCF) capability of material flux, geometric stress concentration, and rapid transition from flexible tube surfaces to stiff constraining elements.

Although described as engaging the exemplary tubes 12, the connection provided by the spacer element and the fastening element may be permanent in one instance. In other instances, the connection provided by the spacer element and fastening element to engage the exemplary tubes 12 may be non-permanent. In some embodiments, the spacer element and the fastening element may be retrofit onto the exemplary tubes 12. The spacer element and the fastening element may be capable of being serviceable or replaceable, in the manufacturing plant or in the field.

The tube spacing and fastening systems of the present disclosure may include shape memory alloy (SMA) bands as a fastening element that provides an advantage over permanently joined spacing and fastening system configurations that sometime hold the tubes too tenaciously during tube reconstitution and/or tend to score the tubes during installation.

The tube spacing and fastening systems of the present disclosure provide a non-brazed, non-welded connection or coupling of tubes. The non-brazed, non-welded tube bundle configurations using shape memory alloy (SMA) bands for connecting the tubes and the spacer element may address issues associated with stress concentration of brazed or welded joints. Shape memory alloy (SMA) bands extended around tubes joining at the spacer element offer smooth stress distribution without any sudden transition of stiffness from spacer element to the tubes.

The tube spacing and fastening systems of the present disclosure may provide adaptive spacing and fastening and dismantling by employing thermally elastic compressive shape memory alloy (SMA) bands that continue to keep tube bundles in continued contact with spacer element even in case of contact wear as is customary for non-brazed and non-welded tube bundle configurations.

The tube spacing and fastening systems of the present disclosure include shape memory alloy (SMA) bands as fastening elements that are provided with a memorized length, and are produced and installed generally around tubes so as to provide tube adaptive spacing. When the shape memory alloy (SMA) bands are at their operating temperature above the transition temperature of the shape memory alloy (SMA) bands, the shape memory alloy (SMA) bands transform to the memorized length, thereby providing reduced spacing and lateral loading to the tubes. The shape memory alloy (SMA) bands thus inherently provide adaptive spacing for the tubes in the tube bundles, in relation to each other and the spacer element.

Exemplary shape memory alloys may include alloys of any of Ni—Ti, or Ni—Ti—Hf, or Ni—Ti—Pd or Ti—Au—Cu Any of the fastening elements of the present disclosure may be a shape memory alloy band. The shape memory alloy bands operate as fasteners to isolate a joint assembly of one or more tubular structures. In some examples, the shape memory alloy (SMA) properties improve the reliability and performance of tube assembly as compared to conventional metal fasteners. The shape memory alloy (SMA) bands enable a high performing and reliable isolation joint assembly through stress induced martensite transformation in shape memory alloy (SMA) band fasteners. For example, shape memory alloy (SMA) bands have superelasticity, variable stiffness, and high energy dissipation. These features may provide the following benefits:

Superelasticity: NiTi based shape memory alloy (SMA) bands demonstrate superelastic behavior up to eight percent to ten percent of recoverable strain. This is compared to 0.2 percent of recoverable strain in typical metal (e.g., steel). The superelastic behavior allows the shape memory alloy (SMA) fasteners to undergo large deformation under high engine imbalance condition without failure and allows for the shape memory alloy (SMA) band to recover back to the shape memory alloy (SMA) band's initial shape when the load (e.g., engine condition) is released.

Variable stiffness: NiTi based shape memory alloy (SMA) bands demonstrate unique variable stiffness that, combined with superelastic behavior, may be tuned to control the system response under different loading or engine operating condition. That is, tuned to allow control of the degree of fastening of the tubular structures.

High energy dissipation: shape memory alloy (SMA) exhibit high damping properties during martensitic phase transformation through hysteretic damping that may assist control of a vibratory response. NiTi shape memory alloy (SMA) bands may demonstrate high hysteretic material damping up to six percent, which is higher than conventional metal (e.g., steel) bands.

Furthermore, the shape memory alloy (SMA) bands design can be used as an effective isolation system to control tube response under engine vibration and/or imbalance condition as follows:

Normal engine vibration: At lower strains (less than one percent), the elastic modulus of the austenite phase of the shape memory alloy (SMA) band comes into action to withstand normal engine operating condition.

High engine vibration and imbalance loads: Under this engine condition, the shape memory alloy (SMA) band can be designed to deform to moderate to high strains levels (up to eight percent). At this strain level, the shape memory alloy (SMA) band behaves as a superelastic material with plateau stress. There may be little or no change in stress level, such that tube joint assembly can withstand large range deformation with almost no increase in stress levels. This low elastic modulus behaviour of the shape memory alloy (SMA) band acts as an effective isolation system for the tubular structures from high input vibration or engine imbalance loads.

Extreme engine imbalance condition like blade out: The shape memory alloy (SMA) band can be designed for large strain (eight percent to ten percent) development under extreme engine imbalance condition. Increased elastic modulus and high strength martensitic phase of fastener can withstand extreme imbalance condition without failure and can recover back to the initial shape of the shape memory alloy (SMA) band when the load is released.

The tube spacing and fastening systems of the present disclosure may include multiple configurations of spacer elements including recessed block, solid unrecessed block, thin-walled, cross formation, or star formation spacer elements that provide a wide flexibility in the number of tubes to be engaged and adaptability in the design of the fastening elements to effectively support and spatially separate individual tubes in an assembled bundle. In some examples, the spacer element may be a thick-walled, solid block. Such a block may include surface features on the contact surfaces to reduce stresses between the thin-walled tubes and the thick-walled spacer element. In some examples, the spacer element may be thin-walled.

The tube spacing and fastening systems of the present disclosure may provide effective stress distribution at tube spacing and fastening system joints, low stress field through protrusions, and/or indentations (also known as 'beads'/'dimples') contoured on recessed blocks, solid blocks, thin-walled, cross formation, or star formation spacer elements, filleted joints and, thereby, improve reliability of each configuration of the tube bundle assemblies.

The tube spacing and fastening systems of the present disclosure may provide cost effective configurations that eliminate inspection and quality control issues related to permanently joined tube bundle assemblies such as brazed joints or welded joints. The tube spacing and fastening systems of the present disclosure improves 'Time on Wing' with by reducing typical field issues related to brazed or welded joints.

The tube spacing and fastening systems of the present disclosure inherently provide adaptive spacing and compact tube bundle routing for optimal tube packaging that save significant amount of space, cost, and weight. In one instance, the fastening element may be replaced without disregarding the tubes.

Further aspects of the present disclosure are provided by the subject matter of the following clauses.

A system includes a spacer element configured to engage a plurality of tubular structures, to spatially separate the plurality of tubular structures from one another, and to distribute stress in the plurality of tubular structures. A fastening element is configured to extend around at least a portion of an outer surface of the plurality of tubular structures, and to fasten the plurality of tubular structures to the spacer element in an adaptively spaced configuration.

The system according to any preceding clause, wherein the adaptively spaced configuration comprises a first length of the fastening element below a predetermined temperature range and a second length of the fastening element above the predetermined temperature range. The first length is different from the second length.

The system according to any preceding clause, wherein the adaptively spaced configuration comprises a first configuration, wherein the plurality of tubular structures are movably spaced around the spacer element and a second configuration, wherein the plurality of tubular structures are immovably spaced around the spacer element.

The system according to any preceding clause, wherein the spacer element includes a first thin-walled bracket to engage a first tubular structure of the plurality of tubular structures and a second thin-walled bracket to engage a second tubular structure of the plurality of tubular structures. The first thin-walled bracket and the second thin-walled bracket join at a top end of the spacer element and at a bottom end of the spacer element.

The system according to any preceding clause, wherein the spacer element includes a first cradle bracket configured to engage a first tubular structure of the plurality of tubular structures, a second cradle bracket configured to engage a second tubular structure of the plurality of tubular structures, and a core part separating the first cradle bracket and the second cradle bracket. The first cradle bracket, the second cradle bracket, and the core part join at a top end of the spacer element and at a bottom end of the spacer element.

The system according to any preceding clause, wherein a first joint between the first cradle bracket and the top end, or a second joint between the second cradle bracket and the top end, or a third joint between the first cradle bracket and the bottom end, or a fourth joint between the second cradle bracket and the bottom end, or any combination thereof, comprises a filleted joint.

The system according to any preceding clause, further includes a first recess formed between the first cradle bracket and a first corresponding surface of the core part, and a second recess formed between the second cradle bracket and a second corresponding surface of the core part. The first recess is configured to accommodate a first part of the fastening element, and the second recess is configured to accommodate a second part of the fastening element.

The system according to any preceding clause, wherein a first tubular structure of the plurality of tubular structures engages with the first cradle bracket at a first contact surface and a second tubular structure of the plurality of tubular structures engages with the second cradle bracket at a second contact surface. The first contact surface, or the second contact surface, or both of the first contact surface and the second contact surface includes a plurality of surface features configured to distribute the stress in the plurality of tubular structures.

The system according to any preceding clause, wherein the plurality of surface features comprises a plurality of protrusions, or indentations, or any combination thereof.

The system according to any preceding clause, wherein the spacer element includes a core part positioned at a center of the spacer element, and a plurality of radial arms arranged in a predetermined formation, each radial arm joining at a respective base with the core part. At least one pair of adjacent radial arms and the core part form a cradle bracket configured to engage a corresponding tubular structure in the cradle bracket.

The system according to any preceding clause, wherein the predetermined formation comprises a cross formation, or a star formation, or any combination thereof.

The system according to any preceding clause, wherein the fastening element comprises a shape memory alloy (SMA) band.

The system according to any preceding clause, wherein the shape memory alloy (SMA) band comprises nickel-titanium shape-memory alloy.

A method includes providing a spacer element, engaging a plurality of tubular structures to the spacer element, spatially separating the plurality of tubular structures from one another, and distributing stress in the plurality of tubular structures, extending a fastening element around at least a portion of an outer surface of the plurality of tubular structures, and fastening the plurality of tubular structures to the spacer element in an adaptively spaced configuration.

The method according to any preceding clause, wherein the fastening of the plurality of tubular structures to the spacer element in the adaptively spaced configuration comprises fastening the plurality of tubular structures to the spacer element by a first length of the fastening element below a predetermined temperature range, and fastening the plurality of tubular structures to the spacer element by a second length of the fastening element above the predetermined temperature range. The first length is different from the second length.

The method according to any preceding clause, wherein the fastening of the plurality of tubular structures to the spacer element in the adaptively spaced configuration comprises fastening the plurality of tubular structures to the spacer element in a first configuration, wherein the plurality of tubular structures are movably spaced around the spacer element, and a second configuration, wherein the plurality of tubular structures are immovably spaced around the spacer element.

The method according to any preceding clause, wherein the engaging of the plurality of tubular structures to the spacer element comprises engaging a first tubular structure of the plurality of tubular structures to a first thin-walled bracket of the spacer element, engaging a second tubular structure of the plurality of tubular structures to a second thin-walled bracket of the spacer element, and joining the first thin-walled bracket, the second thin-walled bracket at a top end of the spacer element and at a bottom end of the spacer element. The spatially separating the plurality of tubular structures from one another comprises spatially separating the first thin-walled bracket and the second thin-walled bracket by a hollow space in between the first thin-walled bracket and the second thin-walled bracket.

The method according to any preceding clause, wherein the engaging of the plurality of tubular structures to the spacer element comprises engaging a first tubular structure of the plurality of tubular structures to a first cradle bracket of the spacer element, engaging a second tubular structure of the plurality of tubular structures to a second cradle bracket of the spacer element, and joining the first cradle bracket, the second cradle bracket, and a core part of the spacer element at a top end of the spacer element and at a bottom end of the spacer element. The spatially separating the plurality of tubular structures from one another comprises spatially separating the first cradle bracket and the second cradle bracket by the core part positioned in between the first cradle bracket and the second cradle bracket.

The method according to any preceding clause, wherein the extending of the fastening element comprises filleting a first joint between the first cradle bracket and the top end, or a second joint between the second cradle bracket and the top end, or a third joint between the first cradle bracket and the bottom end, or a fourth joint between the second cradle bracket and the bottom end, or any combination thereof.

The method according to any preceding clause, wherein the extending of the fastening element comprises accommodating a first part of the fastening element in a first recess between the first cradle bracket and a first corresponding surface of the core part, and accommodating a second part of the fastening element in a second recess between the second cradle bracket and a second corresponding surface of the core part.

The method according to any preceding clause, wherein the engaging of each of the plurality of tubular structures to the spacer element comprises joining a first tubular structure of the plurality of tubular structures and the first cradle bracket at a first contact surface, joining a second tubular structure of the plurality of tubular structures and the second cradle bracket at a second contact surface. The distributing of stress in the plurality of tubular structures comprises providing a plurality of surface features on the first contact surface, or the second contact surface, or both of the first contact surface and the second contact surface.

The method according to any preceding clause, wherein the providing of the plurality of surface features comprises providing a plurality of protrusions, or indentations, or any combination thereof.

The method according to any preceding clause, wherein the providing of the spacer element comprises arranging a plurality of radial arms in a predetermined formation, joining each radial arm at a respective base with a core part of the spacer element, forming a cradle bracket with at least one pair of adjacent radial arms and the core part, and engaging a corresponding one of the plurality of tubular structures in the cradle bracket.

The method according to any preceding clause, wherein the arranging of the plurality of radial arms in the predetermined formation comprises arranging the plurality of radial arms in a cross formation, or arranging the plurality of radial arms in a star formation, or arranging the plurality of radial arms in any combination thereof.

The method according to any preceding clause, wherein the extending the fastening element comprises extending a shape memory alloy (SMA) band.

The method according to any preceding clause, wherein the shape memory alloy (SMA) band comprises nickel-titanium shape-memory alloy.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A system comprising:
   a spacer element configured to engage a plurality of tubular structures, to spatially separate the plurality of tubular structures from one another, and to distribute stress in the plurality of tubular structures, the spacer element comprising:
      a planar end; and
      at least two radially extending arms configured to engage a tubular structure of the plurality of tubular structures, the at least two radially extending arms each having a planar surface and a curved surface, the planar surface and the curved surface engaging the tubular structure; and
   a fastening element comprising a shape memory alloy (SMA) band and configured to be received in the planar end and extend around at least a portion of an outer surface of the plurality of tubular structures to fasten and swage the plurality of tubular structures to the spacer element in an adaptively spaced configuration.

2. The system of claim 1, wherein the adaptively spaced configuration comprises a first length of the fastening element below a predetermined temperature range and a second length of the fastening element above the predetermined temperature range, the first length being different from the second length.

3. The system of claim 1, wherein the adaptively spaced configuration comprises a first configuration, the plurality of tubular structures are movably spaced around the spacer element and a second configuration, the plurality of tubular structures are immovably spaced around the spacer element.

4. The system of claim 1, wherein the shape memory alloy (SMA) band comprises a nickel-titanium shape-memory alloy.

5. The system of claim 1, wherein the spacer element comprises:
   (a) a core part positioned at a center of the spacer element; and
   (b) the at least two radially extending arms arranged in a predetermined formation, each radially extending arm joining at a respective base with the core part, the predetermined formation comprising a cross formation, or a star formation, or any combination thereof.

6. The system of claim 1, wherein the spacer element comprises:
   (a) a first cradle bracket configured to engage a first tubular structure of the plurality of tubular structures;
   (b) a second cradle bracket configured to engage a second tubular structure of the plurality of tubular structures; and
   (c) a core part separating the first cradle bracket and the second cradle bracket,
   wherein the first cradle bracket, the second cradle bracket, and the core part join at a top end of the spacer element or at a bottom end of the spacer element, and
   wherein the first cradle bracket or the second cradle bracket is formed of the at least two radially extending arms.

7. The system of claim 6, wherein the first tubular structure of the plurality of tubular structures engages with the first cradle bracket at a first contact surface and the second tubular structure of the plurality of tubular structures engages with the second cradle bracket at a second contact surface, the first contact surface, or the second contact surface, or both of the first contact surface and the second contact surface comprises a plurality of surface features configured to distribute the stress in the plurality of tubular structures, and the plurality of surface features comprises a plurality of protrusions, or indentations, or any combination thereof.

8. A method comprising:
providing a spacer element having a plurality of cradle brackets each formed of a planar surface and a curved surface;
engaging a plurality of tubular structures to the spacer element such that each tubular structure engages the planar surface and the curved surface of a respective cradle bracket, the spacer element spatially separating the plurality of tubular structures from one another and distributing stress in the plurality of tubular structures;
extending a fastening element comprising a shape memory alloy (SMA) band around at least a portion of an outer surface of the plurality of tubular structures; and
fastening and swaging the plurality of tubular structures to the spacer element in an adaptively spaced configuration.

9. The method of claim 8, wherein the fastening of the plurality of tubular structures to the spacer element in the adaptively spaced configuration comprises fastening the plurality of tubular structures to the spacer element by a first length of the fastening element below a predetermined temperature range, and fastening the plurality of tubular structures to the spacer element by a second length of the fastening element above the predetermined temperature range, the first length being different from the second length.

10. The method of claim 8, wherein the fastening of the plurality of tubular structures to the spacer element in the adaptively spaced configuration comprises fastening the plurality of tubular structures to the spacer element in a first configuration, the plurality of tubular structures are movably spaced around the spacer element, and a second configuration, and the plurality of tubular structures are immovably spaced around the spacer element.

11. The method of claim 8, wherein the providing of the spacer element comprises arranging a plurality of radial arms in a predetermined formation, joining each radial arm at a respective base with a core part of the spacer element, forming a cradle bracket of the plurality of cradle brackets with at least one pair of adjacent radial arms and the core part, and engaging a corresponding one of the plurality of tubular structures in the cradle bracket, and the arranging of the plurality of radial arms in the predetermined formation comprises arranging the plurality of radial arms in a cross formation, or arranging the plurality of radial arms in a star formation, or arranging the plurality of radial arms in any combination thereof.

12. The method of claim 8, wherein the engaging of the plurality of tubular structures to the spacer element comprises engaging a first tubular structure of the plurality of tubular structures to a first cradle bracket of the plurality of cradle brackets, engaging a second tubular structure of the plurality of tubular structures to a second cradle bracket of the plurality of cradle brackets, and joining the first cradle bracket, the second cradle bracket, and a core part of the spacer element at a top end of the spacer element or at a bottom end of the spacer element, and the spatially separating the plurality of tubular structures from one another comprises spatially separating the first cradle bracket and the second cradle bracket by the core part positioned in between the first cradle bracket and the second cradle bracket.

13. The method of claim 12, wherein the engaging of each of the plurality of tubular structures to the spacer element comprises joining the first tubular structure of the plurality of tubular structures and the first cradle bracket at a first contact surface, joining the second tubular structure of the plurality of tubular structures and the second cradle bracket at a second contact surface, the distributing of stress in the plurality of tubular structures comprises providing a plurality of surface features on the first contact surface, or the second contact surface, or both of the first contact surface and the second contact surface, and the providing of the plurality of surface features comprises providing a plurality of protrusions, or indentations, or any combination thereof.

* * * * *